Patented Nov. 1, 1938

2,135,449

UNITED STATES PATENT OFFICE 2,135,449

PROCESS OF PREPARING ALIPHATIC ESTERS

Donald J. Loder, Wilmington, Del., assignor to E. I. du Pont de Nemours & Company, Wilmington, Del., a corporation of Delaware No Drawing. Application December 13, 1935, Serial No. 54,331

13 Claims. (Cl. 260—496)

This invention relates to a process for the formation of organic compounds and particularly to the preparation of carboxylic acid esters by the interaction of aliphatic ethers and carbon monoxide in the presence of a condensing agent.

Many processes have been proposed for the preparation of organic acid esters by the interaction in the vapor phase of alcohols or ethers with the oxides of carbon. It has been shown that methyl acetate may be prepared in varying proportions by the vapor phase condensation of methanol with carbon monoxide in the presence of a suitable catalyst. Moreover, it has been suggested that aliphatic esters may be prepared from methane and carbon dioxide, from carbon monoxide and water vapor, and from ethers and carbon monoxide. These processes, however, have generally been conducted in the vapor phase at elevated temperatures and under superatmospheric pressures, and have been more or less of an academic nature for the reason that yields are low and operating costs high.

An object of this invention is to provide a process for the preparation of higher molecular weight organic compounds through the introduction of carbon monoxide into lower molecular weight organic compounds. A further object of the invention is to provide a process for the preparation of esters by the condensation of aliphatic ethers with carbon oxides in the presence of condensing agents.

A further object of the invention is to provide a process for the preparation of esters having the structural formula $C_nH_{2n+1}COOC_nH_{2n+1}$, from ethers having the structural formula $$(C_nH_{2n+1})_2O,$$

by subjecting the ethers to the action of carbon monoxide in the presence of a highly active condensing agent. Other objects and advantages of the invention will hereinafter appear.

I have found that organic esters can be prepared by passing carbon monoxide into an addition compound formed between a dialkyl ether and boron trifluoride. As a result of the reaction between these compounds an addition compound, which may likewise be called an organic complex, consisting of an alkyl ester of an aliphatic carboxylic acid and boron trifluoride is formed. This product is subsequently reacted with a dialkyl ether, which appears to free the ester from its complex with the halide, the ether preferentially forming a complex with the halide. The resulting mixture is distilled to remove the free ester and leave as a residue a dialkyl ether-boron trifluoride complex which can again be treated with carbon monoxide to form the ester complex. It will be appreciated, therefore, that the more or less expensive catalyst such as boron trifluoride can be continuously recirculated through the process with substantially no loss and due to the exceedingly high rate of reaction an excellent output per synthesis unit renders this process extremely attractive for the preparation of esters at low cost.

The ether-carbon monoxide liquid phase reactions which can be accelerated by the above described process and in a manner which will be more carefully particularized hereinafter may be expressed as follows:

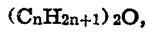

$(C_nH_{2n+1})_2O.BF_3+CO \rightarrow C_nH_{2n+1}COOC_nH_{2n+1}.BF_3$ the ester may be readily removed from the ester .BF$_3$ complex by the addition to the reaction mixture of ethers whereupon a rearrangement will occur, the ether preferentially appearing to form the complex thus freeing the ester which may be readily distilled from the resulting mixture, by the addition of metal halides which acts similarly to the ethers or by other suitable processes.

Other compounds, which contain boron and a halogen and which appear to form similar addition compounds or complexes with the ethers may likewise be employed such, for example, as dihydroxyfluoboric acid, borofluohydric acid, and in general the oxygenated acids obtained from mixtures of hydrofluoric acid, boric acids and borates. Boron fluoride, as well as the other condensing agents, may be used alone or in the presence of promoters, such as, powdered nickel, nickel oxide, mercury oxides or other powdered metals or metal oxides which may be introduced to promote the activity of the condensing agent. Boron fluoride is an excellent condensing agent especially for the conversion of dimethyl ether to methyl acetate, particularly when a low percentage say from 1 to 5% of dihydroxy fluoboric acid or borofluohydric acid is present. Generally, however, I prefer to use boron fluoride alone for it is such a powerful condensing agent that promoters for further extending its condensing ability are not ordinarily necessary.

While I have indicated that boron trifluoride is my preferred condensing agent and boron halogen compounds are generally highly active therefore, nevertheless, for the reaction of some ethers with carbon monoxide, halides or other amphoteric elements or elements whose oxides upon hydrolysis form weak bases and which appear to form complexes with ethers and esters may likewise be employed. Among these condensing agents are included the following anhydrous metal and non-metal halides: titanium chloride, antimony chloride, and the chlorides, bromides, fluorides and iodides of the above metals including boron as well as such halides of aluminum, beryllium, titanium, zirconium, hafnium, thorium, columbium, sulphur, silicon, phosphorus, tantalum, chromium, vanadium and molybdenum.

My preferred condensing agent may be used in various proportions which are governed by the type of ether being treated. In the absence of a promoter the ratio of ether to condensing agent should range generally from 0.1 to 1.0 mol or higher per mol of the ether while in the presence of promoters much lower amounts may be employed. The activating ability of the promoters determines in large measure the amount required, the particular ether as well as temperature and pressure conditions also being taken into consideration.

The synthesis can generally be efficiently carried out under the following operating conditions. Pressure may vary from atmospheric pressures up to 1000 atmospheres or even more. Generally, it appears preferable to operate in the neighborhood of 350 to 750 atmospheres. Temperature within the reaction zone is not particularly critical for, with the highly efficient condensing agents used, the reaction will proceed from room temperatures up to approximately 350° C., practical reaction rates being realized within the range of from 150 to 240° C., under which temperature conditions side reactions are particularly minimized.

The carbon monoxide used may be obtained from various commercial sources, such, for example as water gas, producer gas, coke oven gas, and the like, but to obtain products of the highest degree of purity it is preferable to remove from such commercial gases the objectionable constituents such as sulphur compounds, metal carbonyls, and so forth.

Furthermore, inert gases may be present in the carbon monoxide used and they are, in some instances, desirable. Nitrogen, for instance, has, it appears, little deleterious effect on the reaction or yield and, in fact may be used advantageously in order to aid in the agitation of the ether complex, particularly, if the carbon monoxide is bubbled directly into the ether complex. Other strictly inert gases will usually act similarly to nitrogen.

Not only can methyl ether be condensed in the presence of carbon monoxide and my condensing agent to methyl acetate but the higher ethers such as ethyl ether, propyl ether, butyl ether, diallyl ether, the beta and gamma chlor ethers, cyclohexyl ether, as well as the unsymmetrical ethers, such, for example, as methyl ethyl ether, ethyl propyl ether, methyl propyl ether, methyl allyl ether, anisol and the like may likewise be converted to corresponding esters.

I shall now describe specific embodiments of my process but it will be understood that the details therein given and the compounds employed, either as reactants or as condensing agents in no way restrict the scope of the invention, but merely illustrate methods by which my process can be carried out.

*Example 1.*—46 parts by weight of dry dimethyl ether was passed into a glass vessel simultaneously with the admission of 67.8 parts by weight of dry boron trifluoride. The dimethyl ether and boron trifluoride react readily at room temperature and at atmospheric pressure to form a heavy liquid containing approximately 1 mol of the ether to 1 mol of the halide. 308 parts by weight of the resulting product was placed in a pressure resisting autoclave into which carbon monoxide was admitted until a pressure of 900 atmospheres was obtained. The temperature was raised to and maintained between 150° C.–190° C., for 2 hours. The pressure was released, the temperature lowered to approximately room temperature and the liquid reaction product discharged into a still. The reaction mixture was then subjected to distillation during the admission of dimethyl ether directly into the liquid whereupon methyl acetate was recovered in amounts showing that 65% of the dimethyl ether had been converted to the ester.

The residue which contains approximately 1 mol of dimethyl ether and 1 mol of boron trifluoride is used for the absorption of another mol of carbon monoxide for the formation of more esters. The reaction may thus be repeated almost indefinitely particularly if the boron trifluoride and dimethyl ether lost from by-product formation or from other causes are replaced.

*Example 2.*—248 parts by weight of a product obtained by reacting equal molecular proportions of dimethyl ether and boron trifluoride, was charged into a pressure resisting reaction tube. To this charge 10% of dihydroxy fluoboric acid ($H_3BO_2F_2.BF_3$) was added. A CO pressure of approximately 800 atmospheres was superimposed, and the temperature raised and held between 150° C., to 190° C., for 2 hours. The pressure was released, the temperature lowered and the reaction product discharged having increased to 257 parts by weight. This crude product was distilled while dimethyl ether was constantly being added directly to the crude product throughout the distillation. Methyl acetate was recovered in the distillate showing a conversion of 88% of the dimethyl ether to ester.

*Example 3.*—A high pressure, silver lined autoclave was charged with 163.5 parts by weight $Et_2O.BF_3$ and 98.9 parts by weight $HOH.BF_3$. The autoclave in a shaker machine was heated to 170° C., under an initial CO pressure of 575 atmospheres (at room temperature). Gas absorption began to take place at 158° C. The pressure was thereafter maintained at 800 atmospheres. At the end of 29 minutes at temperature, a pressure drop of 610 atmospheres had occurred. The crude product had increased 43.6 parts by weight. Fractionation of the crude product during which diethyl ether was constantly added yielded 141.4 parts by weight of propionic acid-boron fluoride complex, which is equivalent to 51.8% of the theoretical yield based on the ethyl ether charged. When conducting the synthesis with higher ethers the presence of water or a complex of water with boron fluoride appears to inhibit excessive by-product formation as a result of intercondensation of the products present during intermediate stages of the reaction.

As illustrated by the examples boron halide-water complexes may be used for catalyzing the reactions shown and from the resulting product the ester may be removed by the addition of an ether. The boron halide and water of the complex may be associated in many proportions, the higher the water concentration, however, the slower will be the reaction rate. Ratios of water to boron fluoride up to 5 to 1 have been found satisfactory with preferred ratios ranging from approximately ½ to 1 to 3 to 1 water to boron fluoride.

From a consideration of the above specification it will be appreciated that many changes may be made in the methods disclosed for the condensation of ethers with carbon monoxide to form esters, without departing from the invention or sacrificing any of its advantages.

I claim:

1. In a process for the preparation of an aliphatic carboxylic acid ester by the interaction of an alkyl ether and carbon monoxide the step which comprises reacting one mol of an aliphatic ether with not appreciably more than one mol of carbon monoxide in the presence of a boron halide under temperatures between room temperature and 350° C. and pressures between 1 and 1000 atmospheres, alkyl ether, unreacted with carbon monoxide, being present throughout the reaction.

2. In a process for the preparation of an aliphatic carboxylic acid ester by the interaction of an alkyl ether and carbon monoxide the step which comprises reacting one mol of an aliphatic ether with not appreciably more than one mol of carbon monoxide in the presence of boron trifluoride under temperatures between room temperature and 350° C. and pressures between 1 and 1000 atmospheres, alkyl ether, unreacted with carbon monoxide, being present throughout the reaction.

3. In a process for the preparation of methyl acetate from dimethyl ether and carbon monoxide the step which comprises reacting one mol of dimethyl ether with not appreciably more than one mol of carbon monoxide in the presence of boron trifluoride under temperatures between room temperature and 350° C. and pressures between 1 and 1000 atmospheres dimethyl ether, unreacted with carbon monoxide, being present throughout the reaction.

4. In a process for the preparation of ethyl propionate from diethyl ether and carbon monoxide the step which comprises reacting one mol of diethyl ether with not appreciably more than one mol of carbon monoxide in the presence of boron trifluoride as the condensing agent under temperatures between room temperature and 350° C. and pressures between 1 and 1000 atmospheres, diethyl ether, unreacted with carbon monoxide, being present throughout the reaction.

5. In a process for the preparation of an aliphatic carboxylic acid ester from an alkyl ether complex and carbon monoxide the steps which comprise forming a complex between an alkyl ether and a boron halide, reacting one mol of the resulting complex with approximately one mol of carbon monoxide under temperatures between room temperature and 350° C. and pressures between 1 and 1000 atmospheres, alkyl ether, unreacted with carbon monoxide, being present throughout the reaction.

6. In a process for the preparation of an aliphatic carboxylic acid ester from an alkyl ether complex and carbon monoxide the steps which comprise forming a complex between an alkyl ether and boron fluoride, reacting one mol of the resulting complex with approximately one mol of carbon monoxide under temperatures between room temperature and 350° C. and pressures between 1 and 1000 atmospheres, alkyl ether, unreacted with carbon monoxide, being present throughout the reaction.

7. In a process for the preparation of methyl acetate the steps which comprise forming a complex between 1 mol of dimethyl ether and from 0.1 to 1.0 mols of boron fluoride and subsequently reacting one mol of the resulting complex with approximately one mol of carbon monoxide under temperatures between room temperature and 350° C. and pressures between 1 and 1000 atmospheres, dimethyl ether, unreacted with carbon monoxide, being present throughout the reaction.

8. A process which comprises condensing an aliphatic ether with carbon monoxide in the presence of a boron halide and a water boron halide complex to given an ester of an aliphatic acid.

9. A process for the preparation of an aliphatic carboxylic acid ester which comprises reacting an alkyl ether with carbon monoxide n the presence of a boron halide and water.

10. A process for the preparation of an aliphatic carboxylic acid ester which comprises reacting an alkyl ether with carbon monoxide in the presence of boron trifluoride and water.

11. A process for the preparation of an aliphatic carboxylic acid ester which comprises reacting an alkyl ether with carbon monoxide in the presence of hydrated boron trifluoride as the catalyst.

12. A process for the preparation of methyl acetate which comprises reacting dimethyl ether with carbon monoxide in the presence of hydrated boron trifluoride as the catalyst.

13. A process for the preparation of ethyl propionate which comprises reacting diethyl ether with carbon monoxide in the presence of hydrated boron trifluoride as the catalyst.

DONALD J. LODER.